G. E. SAVAGE.
CHAFING DISH STAND.
APPLICATION FILED APR. 24, 1909.
945,287.
Patented Jan. 4, 1910.
2 SHEETS—SHEET 1.
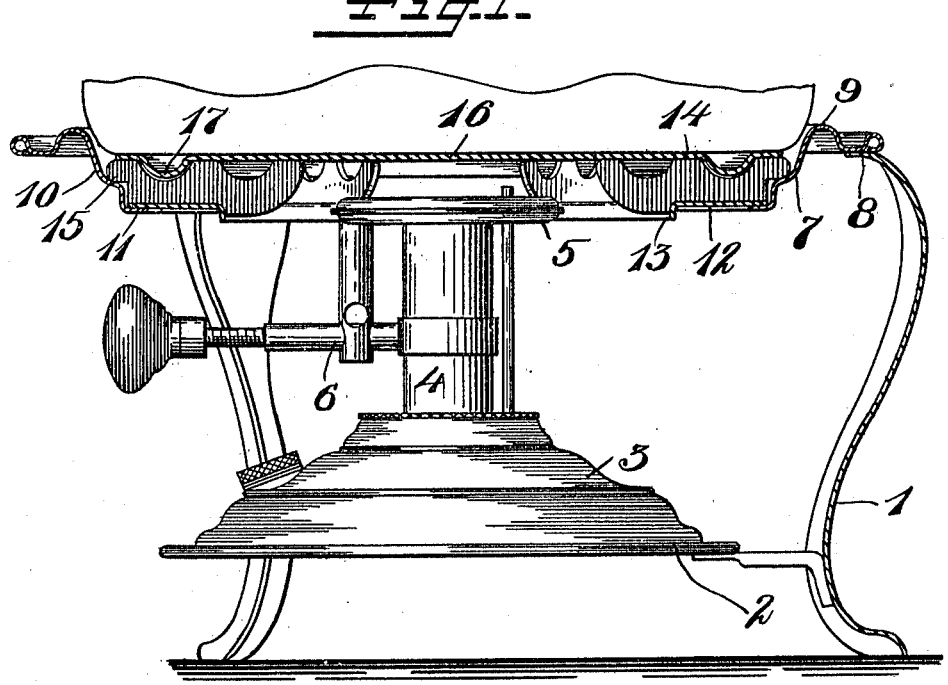
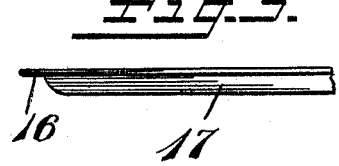
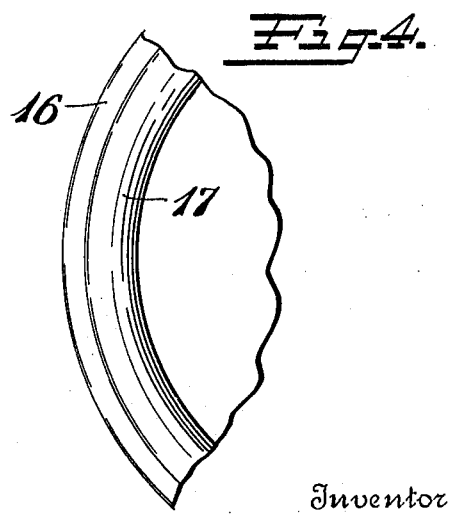
Witnesses:
Inventor
G. E. SAVAGE
By his Attorneys G. E. SAVAGE.
CHAFING DISH STAND.
APPLICATION FILED APR. 24, 1909.
945,287.
Patented Jan. 4, 1910.
2 SHEETS—SHEET 2.
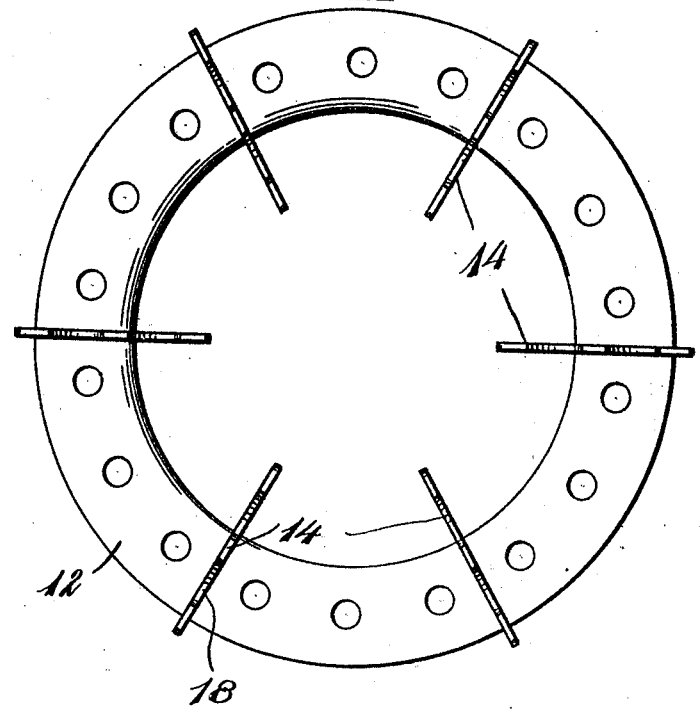
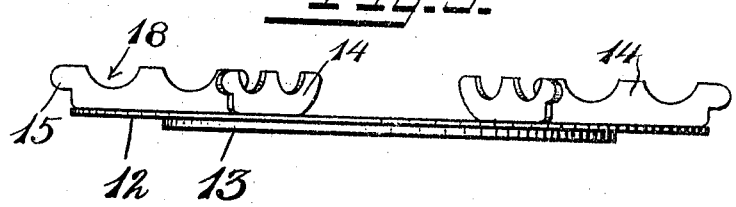
Witnesses:
Inventor
G. E. Savage
By his Attorneys

UNITED STATES PATENT OFFICE.

GEORGE E. SAVAGE, OF MERIDEN, CONNECTICUT, ASSIGNOR TO MANNING, BOWMAN & COMPANY, OF MERIDEN, CONNECTICUT, A CORPORATION OF CONNECTICUT.

CHAFING-DISH STAND.

945,287.  Specification of Letters Patent.  Patented Jan. 4, 1910.

Application filed April 24, 1909. Serial No. 491,910.

*To all whom it may concern:*

Be it known that I, GEORGE E. SAVAGE, a citizen of the United States, residing at Meriden, county of New Haven, State of Connecticut, have invented certain new and useful Improvements in Chafing-Dish Stands, of which the following is a full, clear, and exact description.

My invention relates to improvements in chafing dish stands, and is particularly concerned with stands in which an alcohol vapor lamp is to be used, as distinguished from the ordinary alcohol lamp with exposed wick. Lamps of the character of those used with this invention have a wick tube and generating chamber surmounted by a burner ring, which tube and ring project some considerable distance above the reservoir of the lamp. It is therefore impossible to employ such lamps in ordinary chafing dish stands in which the rim of the cooking vessel rests upon the rim of the stand, and the body of the vessel is sunk well below the stand rim.

This invention, therefore, contemplates a form of plate ring or vessel support which shall hold the vessel at the proper distance above the burner ring of an alcohol vapor stove.

A further object of the invention is to provide means to prevent the vessel from being accidentally displaced or slid off the vessel support, and a further object is to provide means whereby the heating effect of the lamp or stove may be diminished by interposing a solid plate between the flame and the vessel to be heated, in order that the contents of the vessel may be the more slowly cooked.

With these and other objects in view, the invention consists in the construction and arrangement of parts, a preferred embodiment of which is illustrated in the accompanying drawings, in which—

Figure 1 is a view partly in section, of a chafing dish stand and vapor stove therefor embodying my invention. Fig. 2 is a detached view of the plate ring to be used with such stand. Fig. 3 is an edge view of the plate ring. Fig. 4 is a fragmentary view of a plate to be placed over the plate ring to decrease the heating effect of the stove. Fig. 5 is an edge view of the plate illustrated in Fig. 4.

The embodiment of my invention herein selected for illustration comprises a stand consisting of the supporting legs 1 having a lamp or stove supporting ring 2 attached thereto, with an aperture in which the lamp reservoir 3 rests.

The lamp herein illustrated forms no part of the present invention, and therefore is only described to an extent sufficient to fully disclose my present invention. Said lamp comprises a wick tube and generating chamber 4 mounted upon the reservoir 3, said tube being surmounted by the burner ring 5. A suitable needle valve 6 serves to admit the fuel vapor from the generating chamber to the vapor ring. As will be seen from an inspection of Fig. 1, the burner ring stands at a considerable distance above the reservoir of the stove, and therefore the ordinary construction of chafing dish stands in which the vessel is sunk below the rim of the stand could not be suitably employed with this lamp. For the purpose of elevating the vessel to the proper distance above the burner ring, I provide the stand with a rim 7, to which the upper ends of the stand legs are attached, as at 8, which rim may consist of an annular beading 9 having an inwardly extending annular flange 10 at the bottom of which is a substantially horizontal lip 11 upon which the plate ring may rest. The plate ring consists of the annular or ring-like member 12 having a down-turned stiffening lip or flange 13, to which ring the vessel supports 14 may be attached by riveting or otherwise. As indicated in Fig. 1, the vessel supports extend for a considerable distance within the opening of the plate ring 12, and hence vessels of widely different sizes may be supported by said supports. Furthermore, the rear ends 15 of the vessel supports overhang somewhat and fit into the curve of the inwardly extending flange 10 of the stand rim, thereby affording ample support throughout for the vessel carried by said supports. It will be noticed that the annular beading 9 of the stand rim 7 extends appreciably above the plane of the vessel supports 14, whereby said beading forms an effective stop against the accidental lateral displacement or sliding off of the vessel from the stand. In practice, also, it is desirable to make the diameter of the spacing within the beading 9 somewhat greater than that of the vessel to be supported, whereby adequate draft will be permitted between the sides of the vessel and the beading 9.

In some instances it is desirable that the vessel shall not be exposed to the full heating effect of the lamp. To this end I provide a solid sheet metal plate 16, Fig. 1, of somewhat less diameter than the opening within the annular rim 9, and if desired this plate may be provided with a spun-down beading 17 arranged to fit within notches 18 in the vessel supports 14, whereby said plate will be properly centered on said supports. The centering of the solid plate 16 upon the supports, furthermore, serves the purpose of preserving the necessary draft between the edge of the plate and the rim 7 of the stand.

While I have herein described a particular embodiment of my invention, it is to be understood that the same may be varied in detail and arrangement of parts without departing from the spirit and scope thereof.

What I claim is:

1. In a chafing dish stand, a plurality of supporting legs, an annular rim supported thereby having an inwardly extending supporting lip, a plate ring adapted to be supported by said lip, vessel supports carried by said plate ring, said rim arranged to extend above the plane of said vessel supports to form a stop against accidental displacement of a vessel carried thereby.

2. In a chafing dish stand, a plurality of supporting legs, a rim carried thereby having an annular supporting lip, a plate ring adapted to be supported by said lip, a plurality of vessel supports secured to said plate ring and extending well within the opening in said ring, said rim having a portion arranged to project above the plane of said vessel supports to form a stop against accidental displacement of a vessel carried thereby.

3. In a chafing dish stand, a plurality of supporting legs, a rim carried thereby and having a supporting lip, a plate ring adapted to be supported by said lip and having a plurality of vessel supports attached thereto, a solid plate adapted to be arranged over said vessel supports and having means to center the same thereon, said rim having a portion projecting above the plane of said vessel supports to form a stop against accidental displacement of a vessel carried thereby.

4. In a chafing dish stand, a plurality of supporting legs, an annular rim carried thereby and comprising an inwardly and downwardly extending flange, a horizontally extending lip at the base of said flange, a plate ring adapted to be supported by said lip, said plate ring having a plurality of vessel supports, said supports when the parts are assembled arranged to lie below the upper edge of said rim, whereby said rim forms a stop against accidental displacement of the vessels carried by said support.

GEORGE E. SAVAGE.

Witnesses:
E. J. POOLEY,
GEO. R. DIMOCK.